Patented June 9, 1931

1,809,752

UNITED STATES PATENT OFFICE

ALPHONS O. JAEGER, OF CRAFTON, PENNSYLVANIA, ASSIGNOR, BY MESNE ASSIGNMENTS, TO THE SELDEN RESEARCH & ENGINEERING CORPORATION, OF PITTSBURGH, PENNSYLVANIA, A CORPORATION OF DELAWARE

CATALYTIC OXIDATION OF NAPHTHALENE

No Drawing. Original application filed June 3, 1927, Serial No. 196,393. Divided and this application filed March 26, 1928. Serial No. 264,974.

This invention relates to the catalytic oxidation of naphthalene in the vapor phase.

It has been proposed in the past to oxidize naphthalene to intermediate oxidation products, especially phthalic anhydride, by passing the vapors of naphthalene admixed with air over contact masses containing metal elements of the fifth and sixth groups of the periodic system, the most common contact mass being vanadium pentoxide. The reaction is strongly exothermic and tends to get out of control resulting in over oxidation with the production of undesired by-products, such as maleic acid and the like, and large losses by total combustion are also usually encountered. The serious loss of yield and uncertainty of the quality of the product produced presents one of the most serious problems in this important catalysis.

The control is rendered all the more difficult by the fact that when the reaction proceeds too far over oxidation results in the evolution of largely increased quantities of heat which in turn tend to over accelerate the over oxidation so that the reaction in the presence of contact masses used hitherto may be considered to be in an unstable equilibrium and presents a very serious cooling problem. For this reason the catalytic vapor phase oxidation of anthracene to anthraquinone has met with little practical commercial success. Not only does the large evolution of heat which takes place when the reaction proceeds too far result in serious losses in yield or contamination of the product but the catalyst itself is frequently damaged by excessive temperatures which may cause surface sintering.

According to the present invention, catalysts or contact masses containing catalytic elements, whether diluted with carrier particles or undiluted, are associated with stabilizers, which prevent to a large extent undesired side reactions and permit a catalytic control which allows excellent yields and high outputs. The stabilizers used in the present invention are not to be considered as themselves catalysts. In fact, they are characterized by the fact that they contain basic radicals which in their basicity, valence or stability of their oxides at high temperatures toward oxidizing agents are radically different from the characteristics of the catalytic elements. The stabilizing elements which are usually present in the form of salts or other compounds are the alkali metals, some earth metals and other metals which form oxides which are not reducible by hydrogen, all of which elements will be referred to in the present invention as stabilizer forming metals. The salts or other compounds of these stabilizing elements produce a very desirable stabilizing effect, and practically any of the salts can be used which do not contain acid radicals having a deleterious effect upon the particular reaction in which the catalyst is to be utilized. Thus, for example, the acid or neutral sulfates, phosphates, halides, chlorates, nitrates, cyanides, both simple and complex, arsenates, antimonates, bismuthates, borates, carbonates and the like give excellent results.

The stabilizers can be added to the catalysts or contact masses containing the catalysts in a chemically preformed state, or they may be produced by chemical reaction in the presence of the other components of the contact mass. Thus, for example, a stabilized vanadium pentoxide catalyst may be produced by adding potassium bisulfate in suitable amounts to vanadium oxide in any suitable manner, or a potassium vanadate catalyst can be caused to react with vapors containing sulfur trioxide or sulfur dioxide and air, or with dilute sulfuric acid, producing the vanadium oxide and potassium bisulfate in situ. In both cases, the potassium bisulfate will act as a stabilizer, but the action will not be the same as the physical arrangement of the molecules, and perhaps to a certain extent the chemical combination is different with different methods of producing a contact mass having the same empirical chemical composition, and the catalytic activity depends not only on the empirical chemical composition, but also on the physical arrangement and on the method of formation of the contact mass. Stabilizers can, of course, also be generated in situ by reaction of various acid bodies with stabilizer forming metal compounds of components other than the catalyst component of the contact masses.

The stabilizers can be introduced or formed in situ in any desired manner, and in the case of diluted catalysts may be incorporated into the ready formed diluted catalyst, or into a diluent or any of the catalysts or catalyst forming components before actual formation of the contact mass.

Another method of producing stabilized catalysts consists in incorporating catalytic components in carriers which themselves contain stabilizers or which contain compounds capable of forming stabilizers by subsequent treatment.

In the catalytic oxidation of naphthalene the presence of free alkali is undesirable in most contact masses and any free alkali present can be readily neutralized by treatment with acid gases as described in my Patent No. 1,678,627 dated July 24, 1928. This treatment transforms any alkali present into the alkali forming metal salts which act as non-alkaline stabilizers.

Any other suitable method of incorporating compounds of the stabilizer forming metals with catalysts or in contact masses may be used and are included in the present invention.

Diluting catalysts with finely divided or highly porous diluents is frequently desirable, and such diluted catalysts may be associated with stabilizers or stabilizers may be formed therein. It is not definitely known whether diluents of desirable physical structure have any influence on the effect of the stabilizers or not, since any effect on the stabilizer is probably masked by corresponding effects on the catalyst. Thus, diluents of high porosity or capillarity greatly increase the effectiveness of almost any catalyst and naturally, of course, increase the efficiency of any corresponding stabilized catalyst, but whether this added effectiveness is to be attributed partly to effects on the stabilizer or wholly to effects on the catalyst is difficult or impossible to prove and the present invention is not limited to any theories of action of diluents.

While all of the alkali forming metals may be used as stabilizers, I have found that stabilizers containing potassium give better results than do stabilizers containing sodium with any of the contact masses which can be stabilized by the present invention. It will be clear, of course, that the best stabilizer should be chosen for each catalyst.

The amount and nature of the stabilizer to be added depends, of course, on the reacting materials and also in some cases on the reaction product desired. Thus, for example, in the oxidation of naphthalene, a catalyst can be stabilized to produce high yields of phthalic anhydride with a given amount of stabilizer and by the addition of a still larger amount may be made an excellent catalyst for the production of alphanaphthaquinone. In the oxidation of naphthalene to phthalic anhydride, stabilizers containing sodium compounds are relatively poor, whereas stabilizers containing potassium compounds or alkali metals of higher atomic weight give excellent results. The particular stabilizer to be used will, therefore, vary with the reaction and with the nature of the catalyst and it should be clearly understood that while all of the elements enumerated possess stabilizing properties when used in the proper combinations, they are not all equally effective.

It is not definitely known just how the stabilizer acts. I am of the opinion, however, that in many, if not most, catalytic oxidations of organic compounds the most important effect is to reduce its activity in total combustion. In the case of some vanadium oxide catalysts, the color shows that when sufficient stabilizers of suitable types are added, all of the vanadium is not continuously regenerated to vanadium pentoxide, as the catalyst shows various colors of blue, green and gray and does not remain yellow as is the case with an unstabilized vanadium oxide catalyst. Whether, however, this is the only effect of a stabilizer and whether this effect is true with all catalytic elements, is not definitely determined and the present invention is not limited to any theory of action and it may well be that the stabilizer has other actions. It should be noted, however, that while in many cases the stabilizer appears to reduce the oxidation catalytic activity of the catalyst, it does not reduce the efficiency of the catalyst, but on the contrary, greatly increases the overall efficiency, that is to say, the output of the desired intermediate oxidation products per unit of catalyst per unit of time, and it may be that certain activities of the catalyst are actually enhanced and in fact this appears likely, because as has been stated above, all stabilizing elements are not equally effective in their reaction and it may well be that certain stabilizers actually enhance the catalytic power of the catalyst. While it is an advantage of the present invention that in many cases increased outputs are obtained with stabilized catalysts, the invention is in no sense limited to catalysts or processes in which the actual output is increased. In some cases, where extreme purity is desired, this can be obtained with a stabilized catalyst by reducing the loading and the advantges of the present invention can be enjoyed even though the properties of the catalysts of the present invention are not utilized all in one direction, namely, increasing the output. As in all catalytic reactions there is a certain compromise between purity of product and output, and the best compromise to be chosen in every case will be determined by the skilled catalytic chemist.

Stabilized cataylsts when used in oxidation reactions according to the present invention bring about remarkably improved results, and in many cases a stabilizer alone is sufficient. I have found, however, that the addition of other chemical compounds possessing catalytic activity, but not being specific catalysts for the particular reaction, that is to say catalysts which by themselves do not favor the particular reaction in question, namely, the oxidation of naphthalene to to phthalic anhydride, and could not be used alone as effective catalysts for the reaction, appears to enhance the effect of the stabilizer and to tune it for more perfect results for the individual reactions. These compounds will be referred to as stabilizer promoters without thereby limiting the invention to any particular theory of action as it may be that the stabilizer promoters do not act directly on the stabilizer itself. Among the stabilizer promoters are the usual solid, non-volatile, chemical catalysts containing the usual catalytic elements and particularly heavy metals and some amphoteric metals, such as aluminum, zinc, lead and the like. In general, of course, any catalytic element which is not a specific catalyst for the reaction in question may, when combined with a stabilized catalyst for that reaction, act as a stabilizer promoter. Among the most effective stabilizer promoters are, however, some of the catalytic elements which are by themselves relatively weak catalysts, for example catalysts which favor oxidation to a lower stage of reaction and which are not by themselves effective in obtaining useful yields of phathic anhydride and the effect of the stabilizer promoter is not a pure additive one based on the catalytic power of the elements present in the stabilizer promoter. On the contrary, the results tend to indicate that there is a definite cooperation between the stabilizer promoter and the stabilized catalysts and in some cases, the addition of stabilizer promoters produces results greatly in excess of those which would be predicted from the known catalytic power of the promoter elements themselves.

It will thus be apparent that the stabilizer promoter which is not a specific catalyst for the oxidation of naphthalene to phthalic anhydride need not be entirely inert in this reaction, although it may be. Therefore, catalysts which are weak catalysts for the oxidation of naphthalene are included. These weak catalysts may either give a reaction speed too low to be practically used, or they may only favor carrying the reaction to a lower stage of oxidation such as, for example, alphanaphthaquinone.

Stabilizer promoters may be added in a chemically preformed state or formed in situ as has been described in the case of stabilizers, and the forms of introduction may take place in any suitable manner, as will be apparent to the skilled chemist. It is, however, by no means necessary that the stabilizer promoters should be present as separate chemical compounds and on the contrary, many very effective catalysts may be produced by the addition of compounds of the stabilizing forming metals with various stabilizer promoter elements. Thus, for example, the various alkali metal metallates form excellent composite stabilizers and stabilizer promoters. It is possible, of course, that during reaction these compounds break up to a certain extent, and perhaps even in such cases the stabilizer becomes completely dissociated from the stabilizer promoter. It is impossible, however, to determine just what takes place within the catalyst during catalysis, and I do not wish to limit my invention to any theory.

In addition to stabilizers and stabilizer promoters, which are present or are introduced as individual chemical compounds or combined chemically with each other, the stabilizer promoters may be present in chemical combination with various diluents. Thus, for example, many heavy or other metal silicates form at the same time excellent diluents and stabilizer promoters. Notable examples of these compounds are various zeolites in which heavy metal or other elements are present in exchangeable or non-exchangeable form. These zeolites, and in fact, base exchanging bodies generally, whether zeolites or non-silicious base exchange bodies, possess for the most part a microporous structure which is excellently suited as a catalyst diluent or as a framework in or on which catalytically active elements may be hung. Such base exchange bodies permit in some cases also a chemical combination between the stabilizer, stabilizer promoter and the catalyst itself. Thus, for example, a zeolite or other base exchange body may contain a catalytically active element and also a heavy metal or an amphoteric metal oxide associated with stabilizers. Such catalysts are among the most effective for the oxidation of organic compounds and are of course included as one of the important classes of the present invention. The formation of these zeolites or other base exchange bodies, whether containing catalytically active elements in chemical combination or not, is described in the co-pending applications of myself and Johann A. Bertsch, Serial No. 100,116, filed April 6, 1926, and Serial No. 95,771, filed March 18, 1926 and prior Patent No. 1,701,075 dated February 5, 1929, and in my co-pending application Serial No. 142,783, filed October 19, 1926, and Patent No. 1,694,620 dated December 11, 1928, and any of the methods of formation therein set forth may be used to produce base exchange bodies containing stabilizers or stabilizers and stabilizer promoters for use in the oxidation of naphthalene according to the present invention.

The invention is not limited, of course, to the use of any particular diluent, but diluents of high porosity and high capillarity greatly enhance the effectiveness of the contact mass used. The action of the diluents, particularly the porous diluents appears to be primarily due to their physical characteristics. Catalytically active components which are not catalysts for the particular reaction are classified under stabilizer promoters, although, of course, it is difficult in some extreme cases to draw a line between diluents and stabilizer promoters in the case of certain compounds which appear to have weak catalytic activity which may be due to their physical or to their chemical characteristics. In general, however, where components which do not possess fairly high catalytic activity for reactions other than the vapor phase oxidation of naphthalene to phthalic anhydride, as a result of their chemical structure, they are to be classed as diluents rather than stabilizer promoters.

The invention will be described in greater detail in connection with the following specific examples but is not limited to the exact details therein set forth although in its more specific aspects the more specific features of the examples are included.

Example 1

80 parts of kieselguhr or other finely divided material rich in silica are uniformly and homogeneously impregnated with 20% of aqueous solution of caesium carbonate containing 22 parts. The mixture is then formed into granules, and calcined at temperatures up to 400° C. The dried granules are then sprayed at an elevated temperature with 9 parts of a concentrated ammonium vanadate solution, the granules being constantly turned over so that the water of the ammonium vanadate solution is evaporated as soon as it strikes the granules and therefore does not soften them. The treated material is then exposed to a dilute stream of gaseous hydrochloric acid until no more acid is absorbed. Instead of using hydrochloric acid, chlorine may be used.

A contact mass is thus obtained which contains caesium chloride as a stabilizer and is well suited for the catalytic oxidation of many organic compounds, particularly of naphthalene to alphanaphthaquinone when vapors of the former mixed with air in the proportion of 1:60 are passed over the contact mass at temperatures from 370 to 400° C. By reducing the proportion of naphthalene to air from 1:60 to 1:15 phthalic anhydride is obtained as the main product.

Example 2

41 parts of $SiO_2$ in the form of a 33° Bé. potassium waterglass solution are diluted with 200 parts of water and 70 parts of "Celite", which is a compacted kieselguhr occurring on the Pacific coast, are then stirred in. 18 parts of $V_2O_5$ are dissolved up in a concentrated potassium hydroxide solution to form a 10% potassium metavanadate solution. 5 parts of freshly precipitated aluminum oxide are treated with sufficient 5 N. potassium hydroxide solution to dissolve the aluminum oxide in the form of potassium aluminate. These three solutions are mixed with vigorous agitation at temperatures of from 60 to 70° C. and sufficient 10% sulfuric acid is added to cause the whole mass to solidify to a gel. The gel should react alkaline to litmus and is then sucked, thoroughly pressed and dried at temperatures under 100° C., broken into fragments and sprayed with sufficient sulfuric acid or other inorganic acids, for example, 1 part of sulfuric acid diluted with 5 parts of water until a sample in a test tube when covered with water and warmed just reacts acid to congo. A sulfuric acid salt-like body of a potassium-aluminum-vanadium zeolite is thus produced, the vanadium and aluminum being present in non-exchangeable form.

After blowing with air at 300–400° C. this catalyst is well suited for the catalytic oxidation of naphthalene to phthalic anhydride, the naphthalene vapors and air in a mixture of 1:10–15 by weight being passed over the catalyst at 370–420° C.

Example 3

16 parts of vanadic acid in 300 parts of water are reduced to the blue vanadyl sulfate in the usual manner and the solution is divided into 2 parts in the proportion of 3 to 2. The larger portion is then transformed into a coffee-brown potassium vanadite solution to which is added a suspension of 60 to 80 parts of "Celite", which is a compacted kieselguhr occurring on the Pacific coast, in 140 parts of a 33° Bé. potassium waterglass solution which has been diluted with 500 parts of water. Thereafter the smaller portion of the vanadyl sulfate solution is added with vigorous agitation, the whole mass solidifying to a gray-green gel and showing a weak alkalinity to phenolphthalein. The last traces of the zeolite formed can be salted out by the addition of a saturated potassium sulfate or chloride solution. A so-called multicomponent zeolite is thus prepared and the excess alkali can be washed out to a greater or less extent. After treating with alkali the catalyst can be used for the catalytic oxidation of naphthalene air mixtures to alphanaphthaquinone or a phthalic anhydride, depending on the amount of alkali which has been washed out.

This application is a division of my copending application Serial No. 196,393, filed June 3, 1927, which matured into Patent No. 1,709,853 dated April 23, 1929.

What is claimed as new is:

1. A method of oxidizing naphthalene to intermediate oxidation products, which comprises causing vapors of naphthalene and an oxidizing gas to react in the presence of a contact mass having associated therewith at least one compound, other than an oxide or hydroxide, of an element falling within the group consisting of alkali metals and alkaline earth metals.

2. A method of oxidizing naphthalene to intermediate oxidation products, which comprises causing vapors of naphthalene and an oxidizing gas to react in the presence of a contact mass having associated therewith at least one compound, other than an oxide or hydroxide, of an element falling within the group consisting of alkali metals and alkaline earth metals, and at least one catalyst included in the group consisting of hydrogenation catalysts, dehydrogenation catalysts, reduction catalysts, oxidation catalysts which, when used alone, are not specific catalysts for the oxidation of naphthalene to phthalic anhydride.

3. A method of oxidizing naphthalene to intermediate oxidation products, which comprises causing vapors of naphthalene and an oxidizing gas to react in the presence of a contact mass having associated therewith at least one compound, other than an oxide or hydroxide, of an element falling within the group consisting of alkali metals and alkaline earth metals, and also containing an oxygen compound of vanadium as at least one of its catalytically active components.

4. A method of oxidizing naphthalene to intermediate oxidation products, which comprises causing vapors of naphthalene and an oxidizing gas to react in the presence of a contact mass having associated therewith at least one compound of potassium other than the oxide or hydroxide.

5. A method of oxidizing naphthalene to intermediate oxidation products, which comprises causing vapors of naphthalene and an oxidizing gas to react in the presence of a contact mass having associated therewith at least one non-alkaline salt of potassium.

6. A method of oxidizing naphthalene to intermediate oxidation products, which comprises causing vapors of naphthalene and an oxidizing gas to react in the presence of a contact mass containing at least one oxygen compound of vanadium and at least one non-alkaline salt of potassium.

7. A method of oxidizing naphthalene to intermediate oxidation products, which comprises causing vapors of naphthalene and an oxidizing gas to react in the presence of a compound containing at least one oxygen compound of vanadium, at least one non-alkaline salt of potassium, and at least one catalyst included in the group consisting of hydrogenation catalysts, dehydrogenation catalysts, reduction catalysts, oxidation catalysts which, when used alone, are not specific catalysts for the oxidation of naphthalene to phthalic anhydride.

8. A method of oxidizing naphthalene to intermediate products, which comprises vaporizing naphthalene and causing the vapors to react with an oxidizing gas in the presence of a contact mass containing at least one non-silicious base exchange body, the contact mass also containing at least one compound of an element falling within the group consisting of alkali metals, alkaline earth metals and rare earth metals whose oxides are not reducible by hydrogen which act as stabilizers.

9. A method of oxidizing naphthalene to intermediate products, which comprises vaporizing naphthalene and causing the vapors to react with an oxidizing gas in the presence of a contact mass containing at least one non-silicious base exchange body, the contact mass containing at least one compound of an element falling within the group consisting of alkali metals, alkaline earth metals and rare earth metals whose oxides are not reducible by hydrogen which act as stabilizers and at least one catalyst included in the group consisting of hydrogenation catalysts, dehydrogenation catalysts, reduction catalysts, oxidation catalysts which, when used alone, are not specific catalysts for the oxidation of naphthalene to phthalic anhydride.

10. A method of oxidizing naphthalene to intermediate products, which comprises vaporizing naphthalene and causing the vapors to react with an oxidizing gas in the presence of a contact mass containing at least one non-silicious base exchange body, the contact mass also containing at least one compound of an element falling within the group consisting of alkali metals, alkaline earth metals and rare earth metals whose oxides are not reducible by hydrogen which acts as stabilizers chemically combined in the non-silcious base exchange body.

11. A method of oxidizing nahpthalene to intermediate products, which comprises vaporizing naphthalene and causing the vapors to react with an oxidizing gas in the presence of a contact mass containing at least one non-silicious base exchange body, the contact mass containing at least one compound of an element falling within the group consisting of alkali metals, alkaline earth metals and rare earth metals whose oxides are not reducible by hydrogen which act as stabilizers and at least one catalyst included in the group consisting of hydrogenation catalysts, dehydrogenation catalysts, reduction catalysts, oxidation catalysts which, when used alone, are not specific catalysts for the oxidation of naphthalene to phthalic anhydride chemically combined with the non-silicious base exchange body.

12. A method of oxidizing naphthalene to intermediate products, which comprises vaporizing naphthalene and causing the vapors to react with an oxidizing gas in the presence of a contact mass containing at least one non-silicious base exchange body, the contact mass containing at least one compound of an element falling within the group consisting of alkali metals, alkaline earth metals and rare earth metals whose oxides are not reducible by hydrogen which act as stabilizers and at least one catalyst included in the group consisting of hydrogenation catalysts, dehydrogenation catalysts, reduction catalysts, oxidation catalysts which, when used alone, are not specific catalysts for the oxidation of naphthalene to phthalic anhydride chemically combined with the non-silicious base exchange body in non-exchangeable form.

13. A method of oxidizing naphthalene to intermediate products, which comprises vaporizing naphthalene and causing the vapors to react with an oxidizing gas in the presence of a contact mass containing at least one non-silicious base exchange body, the contact mass containing an oxycompound of vanadium as at least one of its catalytically effective components.

14. A method according to claim 8, in which the associated compound is a non-alkaline compound of potassium.

15. A method according to claim 8, in which the associated compound is an acid salt of potassium.

16. A method according to claim 8, in which the associated compound is potassium bisulfate.

17. A method according to claim 8, in which the associated compound is a non-alkaline salt of potassium formed in situ by treating the contact mass with acid gases.

18. A method of oxidizing naphthalene to intermediate products, which comprises vaporizing naphthalene and causing the vapors to react with an oxidizing gas in the presence of a contact mass containing at least one zeolite which is the reaction product of a soluble silicate with at least one metallate and at least one salt the positive acting radical of which contains a metal capable of entering into the non-exchangeable portion of a zeolite molecule, the contact mass also containing at least one compound of a metal element falling within the group consisting of alkali metals, alkaline earth metals and rare earth metals whose oxides are not reducible by hydrogen.

19. A method of oxidizing naphthalene to intermediate products, which comprises vaporizing naphthalene and causing the vapors to react with an oxidizing gas in the presence of a contact mass containing at least one zeolite which is the reaction product of a soluble silicate with at least one metallate and at least one salt, the positive acting radical of which contains a metal capable of entering into the non-exchangeable portion of a zeolite molecule, the contact mass also containing at least one compound of a metal element included within the group consisting of alkali metals, alkaline earth metals and rare earth metals whose oxides are not reducible by hydrogen, and at least one catalyst included in the group consisting of hydrogenation catalysts, dehydrogenation catalysts, reduction catalysts, oxidation catalysts which, when used alone, are not specific catalysts for the oxidation of naphthalene to phthalic anhydride.

20. A method of oxidizing naphthalene to intermediate products, which comprises vaporizing naphthalene and causing the vapors to react with an oxidizing gas in the presence of a contact mass containing at least one zeolite which is the reaction product of a soluble silicate with at least one metallate and at least one salt the positive acting radical of which contains a metal capable of entering into the non-exchangeable portion of a zeolite molecule, the contact mass also containing at least one compound of a metal element included within the group consisting of alkali metals, alkaline earth metals and rare earth metals whose oxides are not reducible by hydrogen chemically combined in the zeolite.

21. A method of oxidizing naphthalene to intermediate products, which comprises vaporizing naphthalene and causing the vapors to react with an oxidizing gas in the presence of a contact mass containing at least one zeolite which is the reaction product of a soluble silicate with at least one metallate and at least one salt, the positive acting radical of which contains a metal capable of entering into the non-exchangeable portion of a zeolite molecule, the contact mass containing at least one compound of a metal element included within the group consisting of alkali metals, alkaline earth metals and rare earth metals whose oxides are not reducible by hydrogen, and at least one catalyst included in the group consisting of hydrogenation catalysts, dehydrogenation catalysts, reduction catalysts, oxidation catalysts which, when used alone, are not specific catalysts for the oxidation of naphthalene to phthalic anhydride chemically combined with the zeolite.

22. A method of oxidizing naphthalene to intermediate products, which comprises vaporizing naphthalene and causing the vapors to react with an oxidizing gas in the presence of a contact mass containing at least one zeolite which is the reaction product of a soluble silicate with at least one metallate and at least one salt, the positive acting radical of which contains a metal capable of entering into the non-exchangeable portion of a zeolite molecule, the contact mass containing at least one compound of a metal element included within the group consisting of alkali metals, alkaline earth metals and rare earth metals whose oxides are not reducible by hydrogen, and at least one catalyst included in the group consisting of hydrogenation catalysts, dehydrogenation catalysts, reduction catalysts, oxidation catalysts which, when used alone, are not specific catalysts for the oxidation of naphthalene to phthalic anhydride chemically combined with the zeolite in non-exchangeable form.

23. A method of oxidizing naphthalene to intermediate products, which comprises vaporizing naphthalene and causing the vapors to react with an oxidizing gas in the presence of a contact mass containing at least one zeolite which is the reaction product of a soluble silicate with at least one metallate and at least one salt, the positive acting radical of which contains a metal capable of entering into the non-exchangeable portion of a zeolite molecule, the contact mass containing an oxy compound of vanadium as at least one of its catalytically effective components.

24. A method according to claim 18, in which the associated compound is a non-alkaline compound of potassium.

25. A method according to claim 18, in which the associated compound is an acid salt of potassium.

26. A method according to claim 18, in which the associated compound is potassium bisulfate.

27. A method according to claim 18, in which the associated compound is a non-alkaline salt of potassium formed in situ by treating the contact mass with acid gases.

Signed at Pittsburgh, Pennsylvania, this 21st day of March, 1928.

ALPHONS O. JAEGER.